Patented Aug. 23, 1932

1,873,537

UNITED STATES PATENT OFFICE

RALPH L. BROWN AND WILLIAM W. ODELL, OF PITTSBURGH, PENNSYLVANIA

PROCESS OF SYNTHESIZING ETHERS

No Drawing.   Application filed October 8, 1927. Serial No. 225,019.

This invention relates in particular to the process of making ethers from alcohols, preferably by the aid of a catalyst, under conditions of temperature and pressure found to be preferentially favorable to particular chemical reactions.

The general objects of this invention are:
1.—To make simple or mixed ethers from monohydric alcohols.
2.—To make organic, oxygen-containing compounds having an ether-linkage from organic hydroxy compounds.
3.—To make highly volatile products from organic hydroxy-compounds, which are adaptable for use in the enrichment of lean combustible gas.
4.—To make low-boiling ethers from alcohols having higher boiling points.
5.—To afford a ready means of making ethers from $CO + H_2$, with alcohols as the intermediate step, and
6.—To make organic dehydration products from organic compounds capable of reacting chemically forming a multiplicity of reaction products, one of which is water.

It is common knowledge that alcohols or hydrocarbons can be made from water gas, $CO + H_2$, as shown in Equations 1, 2, 3 and 4—

(1)  $CO + 2H_2 = CH_3OH$
(2)  $2CO + 4H_2 = C_2H_5OH + H_2O$
(3)  $6CO + 4H_2 = C_3H_8 + 3CO_2$
(4)  $2CO + 5H_2 = C_2H_6 + 2H_2O$ or similar equations, but the commercial production of ethers from the alcohols is usually an involved process in which intermediate compounds containing inorganic acid radicals are usually formed. So far as we are aware, no attempt has been made other than our own to make a direct conversion of an hydroxy organic compound to an ether in one direct step under controlled and commercially practicable conditions. Higher ethers than ethyl ether can not readily be made by the ordinary processes for making ethers without the formation of large quantities of gaseous products. One of the advantages which we claim for our process is that decomposition with the formation of gas is reduced to a minimum by its use and higher ethers can readily and commercially be manufactured thereby.

Briefly, our process comprises passing the alcohol or other hydroxy organic compound, preferably in the vapor phase, through a reaction chamber contacting therein a catalyst such as $Al_2O_3$, while heated to approximately 250° C. or higher, at pressure greater than atmospheric, forming an ether. Equation (5)

(5)  $2CH_3OH = CH_3OCH_3 + H_2O$ is representative of the nature of the reactions catalyzed by $Al_2O_3$ at this pressure and temperature. It will be noted that in reactions of which Equation (5) is typical there is not a change in volume of the gaseous products, 2 volumes of an alcohol yielding 1 volume of an ether and 1 volume of water vapor. Therefore, a change in pressure is substantially without appreciable effect upon the direction of the reaction, namely whether it goes from left to right or vice versa in equations such as (5). The temperature and concentration of $H_2O$ vapor have considerable bearing upon equilibrium conditions.

Ethyl alcohol, as well as other alcohols, sometimes decompose as represented by Equations (6) and (7), (6)  $2C_2H_5OH = 2C_2H_4 + 2H_2O$
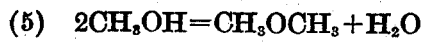
2 volumes = 2 volumes + 2 volumes
(7)  $2C_2H_5OH = 2H_2 + 2CH_3CHO$
2 volumes = 2 volumes + 2 volumes but these reactions are accompanied by a change in volume differentiating them from reactions typified by Equation (5), therefore by controlling the pressure and temperature these reactions can be reduced to almost nil.

An increase in pressure tends to cause reactions such as shown in Equations (6) and (7) to go from right to left. Within certain limits an increase in temperature has the same effect since the reactions are exothermic. We have found that by controlling the temperature and pressure we can convert substantially all of the gaseous hydroxy-compounds into etherial compounds substantially in accordance with the reaction shown as an example in Equation (5).

Equation (7) indicates the possibility of an aldehyde forming from the alcohol; we find that it does not take place under the conditions of our process to an appreciable extent, probably because of the pressure employed. Equation (6) shows that alcohols may yield olefins and water upon decomposition; this also is controlled by controlling the pressure and temperature.

Primarily we are concerned with the production of etherial substances from hydroxy organic compounds. In this connection alone we are not necessarily interested in the method of producing the alcohol since the steps are not always coactive. What we claim and believe to be new is the process of making organic compounds having the general formula R·O·R from organic compounds having the general formula R·OH, by the aid of a catalyst such as $Al_2O_3$, other metal oxide or the like, at temperatures usually above 100° C. and usually below 400° C. under controlled and predetermined pressures, which pressures preferably are above atmospheric and sufficiently high to keep reactions as shown in Equations (6) and (7), left to right, within desired bounds or sufficiently high to substantially prevent the occurrence of reactions of this nature.

In our patent application, Serial No. 221,129 filed Sept. 21, 1927, we disclosed a process for making alcohols and ethers; in this application we are concerned with that special condition when it is desirable to make compounds such as ethers from compounds such as alcohols.

We have shown that the employment of higher pressures than one atmosphere aid in our process, not by hastening the particular chemical reaction involved in the production of ethers or in determining the direction of the reaction, but by preventing the formation of undesirable miscellaneous reactions which normally are accompanied by an increase in volume of the end products, such as in Equations (6) and (7). We desire to carry out our process, in the production of lower, simple ethers from simple monohydric alcohols, in the vapor phase and at about 250° to 300° C.; under this condition the preferred limiting maximum pressure is below that at which the alcohols, reacting to yield ethers, condense. When working at temperatures above the critical temperature, pressure is limited chiefly by economy of operation after a point is reached where decomposition reactions are not annoying. Starting with methyl alcohol in the preparation of methyl ether, employing a temperature of 275° C., a pressure of 10 to 70 atmospheres is satisfactory. The critical temperature of methyl alcohol is approximately 240° C., and the critical pressure is approximately 75 atmospheres. Therefore, for working pressures higher than 75 atmospheres absolute, it is necessary that the temperature of the alcohol be above 240° C. in order to carry out the reactions in the vapor phase. Similarly, for converting ethyl alcohol into ethyl ether at 62 atmospheres absolute pressure, it is necessary to employ a temperature of about 240° C. or higher for vapor phase reaction. The critical temperature of ethyl alcohol being 240° C. and the critical pressure being 62.1 atmospheres. Some hydroxy compounds decompose when heated appreciably above 100° C., and in some cases to operate in the vapor phase it is necessary to use pressures that are not much above 1 atmosphere. Accordingly, we prefer not to limit ourselves other than to pressures greater than atmospheric, and temperatures above 100° C. and usually below 400° C.

It will appear that when the vapors of the hydroxy-compounds are created by heating the latter confined in a retainer adapted to withstand high internal pressures, such as in a boiler, and when the vapors are withdrawn therefrom and used under their own vapor pressure, little consideration need be given to the temperature-pressure relations except to make sure that the critical temperature is not reached within said retainer. When using hydroxy-compounds which do not readily decompose this method affords a simple means of obtaining vapors under pressure and heated substantially to working temperatures; the vapors should, preferably, be superheated before contacting the catalyst. For higher temperatures a suitable superheater may be used.

Thus far only monohydric alcohols have been considered and discussed but we do not limit ourselves to this class of compounds. Other hydroxy compounds function in like manner when similarly treated; the temperature and pressure conditions optimum for the various hydroxy-compounds varies and is determined by tests for each particular case. Phenol has a critical temperature of 419° C., and boils at approximately 185° C., and in order to create pressure greater than 1 atmosphere absolute by heating the confined liquid the temperature must be above 185° C. and below 419° C. The chemical equation resulting from dehydrating phenol is shown in Equation (8), (8) $2C_6H_5OH = C_6H_5 \cdot O \cdot C_6H_5 + H_2O$ diphenyloxide being the end product sought. In this instance, upon cooling and condensing, the latter product may be obtained in crystalline form or as a liquid.

A somewhat different set of conditions arise when attempting to cause similar reactions between different hydroxy compounds such, for example, as phenol and ethyl alcohol, as shown in Equation (9).

(9) $C_6H_5OH + C_2H_5OH = C_6H_5 \cdot O \cdot C_2H_5 + H_2O$

In this manner phenyl-ethyl-ether is formed. In thus combining hydroxy compounds having widely different vapor pressure characteristics, they may be vaporized separately and mixed under temperature-pressure conditions adjusted to maintain the mixture in the vapor phase and in this state be exposed to a catalyst.

In this application the term hydroxy-compound is understood to signify an organic compound containing at least one (OH) radical.

By ether-linkage is meant each of the bonds of at least one oxygen atom of the molecule is directly connected with 2 carbon atoms.

In the production of alcohols from $CO + H_2$, higher pressures and temperatures are required than for the production of an ether from an alcohol by our process. We have found that the alcohols as thus made can be cooled somewhat while still under pressure, some of the $H_2O$ condensed, when present, and removed, the pressure then somewhat decreased, thus superheating the vapors, and the latter vapors then, while still hot, and under pressure appreciably greater than atmospheric, can readily be caused to contact an $Al_2O_3$ catalyst or the like with the result that R·O·R is formed from R·OH. A mixed alcohol and ether thus made is miscible with gasoline and is thus adaptable as a motor fuel.

There is a state of equilibrium in the production of ethers and the like, the reaction not going to completion because of the presence of the $H_2O$ formed; in other words, the law of mass action applies.

We have found that by starting with sufficiently high temperatures and pressure of the vapor ROH to be converted to R·O·R, a simple means of reducing this difficulty to a minimum is to employ a number of catalyst chambers in series, starting with a high temperature and pressure in the first chamber and, after passage through the latter, cooling somewhat, condensing and removing $H_2O$, reducing the pressure somewhat, (thus superheating the vapors) passing the vapors through chamber 2 and repeating the temperature-pressure step-down process when desired. The limit being an economic limit, namely, when the conversion of R·OH into R·O·R is so complete that further processing is not an economy it is discontinued. The temperature-pressure changes are such that the operation is entirely in the vapor phase and such that with respect to $H_2O$ the vapor is superheated. This means of carrying out our process is adaptable to use in the methanol process or the like directly or to R·OH products which are not initially available heated and under pressure but which must first be heated.

$Al_2O_3$ catalyst seems to function by reason of an adsorbent thin layer of $H_2O$ molecules and it is probably that for this reason we obtain best results when some $H_2O$ vapor is present in the reaction stage but obviously this $H_2O$ vapor must not be present as liquid $H_2O$. Neither should the temperature during contact of vapors with catalyst be appreciably in excess of 374° C., which is the critical temperature of water vapor because catalytic activity of $Al_2O_3$ decreases markedly at, and close to this temperature. When the vapors contacting the catalyst contain $H_2O$ as condensed, entrained droplets and the catalyst becomes flooded with $H_2O$ its activity is impaired; this, we believe, is the reason we get better results when the vapors are somewhat superheated, particularly with respect to $H_2O$. The reactions being exothermic, it is not necessary to superheat to a high degree; slight superheating sufficing in insulated systems.

Another dehydration reaction which can be carried out catalytically by our process but which is not the dehydration of an organic hydroxy-compound, is as follows: $2H_2S + CO_2 = CS_2 + 2H_2O$. The removal of the $H_2O$ from the reaction products by the cyclic steps herein described, or by any other suitable means aids materially in carrying out the reaction under pressure with the formation of $CS_2$.

We claim:

1. The process of making organic compounds having ether linkages from organic hydroxy-compounds adapted to be dehydrated catalytically by a solid catalyst, comprising causing said hydroxy-compounds, heated to a temperature above their critical temperature to contact a solid catalyst, under pressure appreciably greater than atmospheric and to be dehydrated forming said compounds having ether linkages by virtue of said catalyst; said organic hydroxy-compounds being substantially alcohols higher than ethyl alcohol.

2. The process of synthesizing ethers, comprising, causing an organic aromatic hydroxy compound adapted to be dehydrated, at a temperature above its normal boiling point and under high superatmospheric pressure to contact with a solid catalyst and to be dehydrated by catalytic chemical reaction yielding an ether; said catalyst having the property of catalyzing dehydration reactions and being substantially devoid of the property of entering into chemical reaction with said hydroxy compound; said pressure being sufficient to substantially prevent the formation of gaseous products of decomposition of said hydroxy compound but insufficient to liquefy it.

3. The process of synthesizing ethers, comprising, causing the hot vapor of a phenolic organic hydroxy compound adapted to be dehydrated to an ether, at a temperature of 240° centigrade to 400° centigrade under pressure appreciably greater than one atmosphere, to contact a solid catalyst and to be dehydrated by catalytic chemical reaction yielding said ether; said catalyst having the property of catalyzing dehydration reactions and being substantially devoid of the property of forming stable compounds with said hydroxy compound; said pressure being sufficient to substantially prevent the formation of gaseous products of decomposition of said hydroxy compound but insufficient to liquefy it.

4. The process of synthesizing ethers, comprising, causing the superheated vapor of an aromatic organic hydroxy compound adapted to be dehydrated to an ether, at a temperature above its normal boiling point but below about 400° centigrade under pressure appreciably greater than atmospheric, to contact a solid catalyst and to be dehydrated by catalytic chemical reaction forming said ether; said catalyst having the property of catalyzing dehydration reactions and being substantially devoid of the property of forming stable compounds with said hydroxy compound; said pressure being sufficient to substantially prevent the formation of gaseous products of decomposition of said hydroxy compound but insufficient to liquefy it.

5. The process of synthesizing ethers, comprising, causing the superheated vapor of an aromatic organic hydroxy compound adapted to be dehydrated to an ether, at a temperature above its normal boiling point but below about 400° centigrade under pressure appreciably greater than atmospheric, to contact a solid, metal oxide catalyst and to be dehydrated by catalytic chemical reaction forming said ether; said catalyst having the property of catalyzing dehydration reactions and being substantially devoid of the property of forming stable compounds with said hydroxy compound; said pressure being sufficient to substantially prevent the formation of gaseous products of decomposition of said hydroxy compound but insufficient to liquefy it.

6. The process of synthesizing ethers having greater molecular weight than that of ethyl ether, comprising, causing the vapor of an organic hydroxy compound having greater molecular weight than ethyl alcohol adapted to be dehydrated to an ether, at a temperature above its normal boiling point but below about 400° centigrade under pressure appreciably greater than atmospheric, to contact a solid catalyst and to be dehydrated by catalytic chemical reaction forming said ether; said catalyst having the property of catalyzing dehydration reactions and being substantially devoid of the property of forming stable compounds with said hydroxy compound; said pressure being sufficient to substantially prevent the formation of gaseous products of decomposition of said hydroxy compound but insufficient to liquefy it.

7. The process of synthesizing ethers having greater molecular weight than diethyl oxide from the corresponding simple alcohols, comprising, causing the superheated vapor of one of said monohydric alcohols adapted to be dehydrated to an ether, at a temperature above 200° centigrade but below 400° centigrade under pressure appreciably greater than one atmosphere to contact a solid catalyst and to be dehydrated by catalytic chemical reaction forming said ether; said catalyst having the property of catalyzing dehydration reactions and being substantially devoid of the property of forming stable compounds with said hydroxy compound; said pressure being sufficient to substantially prevent the formation of gaseous products of decomposition of said hydroxy compound but insufficient to liquefy it.

8. The process of synthesizing ethers from organic hydroxy compounds adapted to be dehydrated comprised of simple alcohols having a greater molecular weight than that of ethyl alcohol, comprising, causing the superheated vapor of such an alcohol, at a temperature above 200° centigrade but below 400° centigrade under pressure greater than 10 atmospheres to contact a chemically inactive solid catalyst and to be dehydrated by catalytical chemical reaction forming as a product of dehydration the corresponding ether, substantially according to the general equation $2ROH = R \cdot O \cdot R + H_2O$, wherein R is an alkyl, said catalyst having the property of catalyzing dehydration reactions.

9. The process of synthesizing simple ethers from simple alcohols adapted to be dehydrated, comprising, causing the superheated vapor of a particular monohydric alcohol having a greater molecular weight than ethyl alcohol, in the vapor phase under pressure appreciably greater than one atmosphere and at a temperature above 200° centigrade but below 400° centigrade to contact a solid catalyst and to be dehydrated by catalytic chemical reaction forming as a product of dehydration the corresponding ether according to the general equation $2ROH = R \cdot O \cdot R + H_2O$, wherein R is an alkyl, without appreciable formation of gaseous decomposition products; said catalyst having the property of catalyzing dehydration reactions; said pressure being sufficiently high to substantially prevent decomposition of said alcohol by the action of heat.

10. The process of synthesizing ethers having greater molecular weight than diethyl oxide from organic hydroxy compounds adapted to be catalytically dehydrated forming corresponding ethers which compounds may be represented chemically by the general formula R·OH, comprising, causing the superheated vapors of said R·OH compound at a temperature above 100° centigrade but below 400° centigrade under pressure appreciably greater than one atmosphere absolute, to pass under its own vapor pressure into contact with a solid catalyst comprising aluminum oxide and to be dehydrated by catalytic chemical reaction forming as a product of dehydration the corresponding ether having the general formula R·O·R substantially without the formation of gases of decomposition, the radical "R" in said R·OH and R·O·R being an alkyl; said catalyst having the property of catalyzing said dehydration reaction; said pressure being sufficiently high to substantially prevent the decomposition of said R·OH by the action of heat.

11. The process of synthesizing ethers which may be represented chemically by the general formula R·O·M, forming a mixture of organic hydroxy compounds which may be represented chemically by the general formulæ R·OH and M·OH, adapted to be catalytically dehydrated, comprising, causing a mixture of the superheated vapors of said R·OH and M·OH at a temperature above 100° centigrade but below 400° centigrade under pressure appreciably greater than one atmosphere absolute, to contact a solid catalyst and to be dehydrated by catalytic chemical reaction forming as a product of dehydration said R·O·M substantially according to the general equation R·OH+M·OH=R·O·M+H$_2$O, wherein R and M are different alkyls, said catalyst having the property of catalyzing the dehydration reaction without itself entering chemical reaction with said hydroxy compounds; said pressure being sufficiently high to substantially prevent the decomposition of said hydroxy compounds by the action of heat.

12. The process of synthesizing ethers from aromatic organic hydroxy compounds adapted to be catalytically dehydrated to said ethers, comprising, causing the vapors of said hydroxy compounds at a temperature above their critical temperature under pressure greater than one atmosphere absolute, to contact an aluminum oxide catalyst and to be dehydrated by catalytic chemical reaction forming said ethers; said catalyst having the property of catalyzing the dehydration reactions; said pressure being sufficiently great to substantially prevent the decomposition of said hydroxy compounds by the action of heat.

13. The process of synthesizing ethers having greater molecular weight than diethyl oxide from the corresponding organic hydroxy compounds adapted to be catalytically dehydrated, comprising, heating said hydroxy compounds confined in a retainer adapted to withstand high internal pressures, to a temperature above 100° centigrade but below 400° centigrade, causing the vapors resulting from said heating to become superheated and to contact at superatmospheric pressure a solid catalyst adapted to catalyze dehydration reactions without itself entering into chemical reaction with said hydroxy compounds, causing said reactions to occur in a reaction chamber by virtue of said catalyst thereby forming said ethers, subsequently removing the reaction products from said chamber cooling and condensing them.

14. The process of synthesizing ethers having greater molecular weight than diethyl oxide from the corresponding organic hydroxy compounds adapted to be catalytically dehydrated, comprising, heating said hydroxy compounds confined in a retainer adapted to withstand high internal pressures, to a temperature above their normal boiling points, creating a vapor pressure therein greater than ten atmospheres absolute, causing the vapors thus produced to become superheated, causing said superheated vapors to pass under their own vapor pressures into contact with a solid catalyst adapted to catalyze dehydration reactions in a reaction chamber, causing said reactions to occur by virtue of said catalyst thereby forming said ethers, subsequently cooling, condensing and separating the organic reaction products from water of dehydration.

15. The process of making organic dehydration products from organic hydroxy compounds capable of dehydration by catalytic chemical reaction with the formation of water as one of the reaction products, comprising, conducting a mixture of said compounds in the superheated gaseous condition at a temperature above 100° centigrade but below 400° centigrade under pressure appreciably greater than one atmosphere absolute, into contact with a metal-oxide catalyst adapted to catalyze chemical dehydration reactions, in a series of catalyzing chambers, causing dehydration products to form by virtue of said catalyst, the temperature of the unreacted compounds along with the reaction products being serially reduced between each of said chambers and the water thus condensed being separated, the pressure of said reaction compounds being serially reduced between each of said chambers after said separation of water, subsequently cooling and condensing said reaction products.

16. The process of synthesizing ethers from organic hydroxy compounds adapted to be catalytically dehydrated, comprising, conducting one of said hydroxy compounds in the superheated gaseous condition at a temperature above 100° centigrade but below 400° centigrade under pressure appreciably greater than one atmosphere absolute, into contact with a metal-oxide catalyst adapted to catalyze chemical dehydration reactions, in a series of catalyzing chambers, causing dehydration to occur with the formation of the corresponding ether by virtue of said catalyst, the temperature of the reaction products being serially reduced between each of said chambers and the water thus condensed being separated, the pressure being serially reduced between each of said chambers.

17. In the process of synthesizing ethers by the catalytic dehydration of alcohols having higher molecular weights than ethyl hydroxide, in the vapor phase by the aid of a solid catalyst adapted to catalyze dehydration reactions at a temperature above 100° centigrade but below 400° centigrade, the method of simultaneously decreasing the generation of gas and increasing the yield of condensable reaction products, comprising, causing said alcohols heated above 100° centigrade but below 400° centigrade to contact said catalyst and to be dehydrated catalytically while under pressure appreciably greater than one atmosphere absolute, being sufficiently great to substantially prevent the decomposition of said hydroxy compounds and said reaction products.

18. In the process of synthesizing ethers from organic hydroxy compounds adapted to be catalytically dehydrated in the vapor phase by virtue of a solid catalyst adapted to catalyze dehydration reactions at a temperature above 100° centigrade but below 400° centigrade, comprising, causing said hydroxy compounds heated to said temperature to contact said catalyst serially in a plurality of reaction chambers under pressure greater than atmospheric but sufficiently high to substantially prevent the decomposition of said hydroxy compounds and said reaction products, and causing a reduction in temperature of the reaction products, condensation and removal of water therefrom and subsequent reduction of pressure after the contact with said catalyst in each chamber.

19. In the process of producing organic hydration products having ether linkages by chemical reactions at superatmospheric pressure and at a temperature above 100° centigrade but below 400° centigrade between organic hydroxy compounds adapted to be dehydrated with the formation of ethers in the vapor phase by virtue of a solid catalyst adapted to catalyze dehydration reactions, the steps consisting in substantially preventing decomposition of both the reaction products and reactants comprising, maintaining the system under the necessary pressure corresponding to the chosen temperature and the step comprising removing the reactants and products from the catalytical reaction chamber in order to permit the condensation of water before said reactions are complete and subsequently causing the dehydrated reaction mixture to undergo further ether-forming reaction in a catalytic chamber.

RALPH L. BROWN.
WILLIAM W. ODELL.